Nov. 4, 1969    E. CARNALL, JR    3,476,690
OPTICALLY USEFUL ELEMENTS OF HOT PRESSED LITHIUM FLUORIDE
DOPED MAGNESIUM OXIDE AND METHOD OF FORMING SAME
Filed Nov. 9, 1966    5 Sheets-Sheet 1
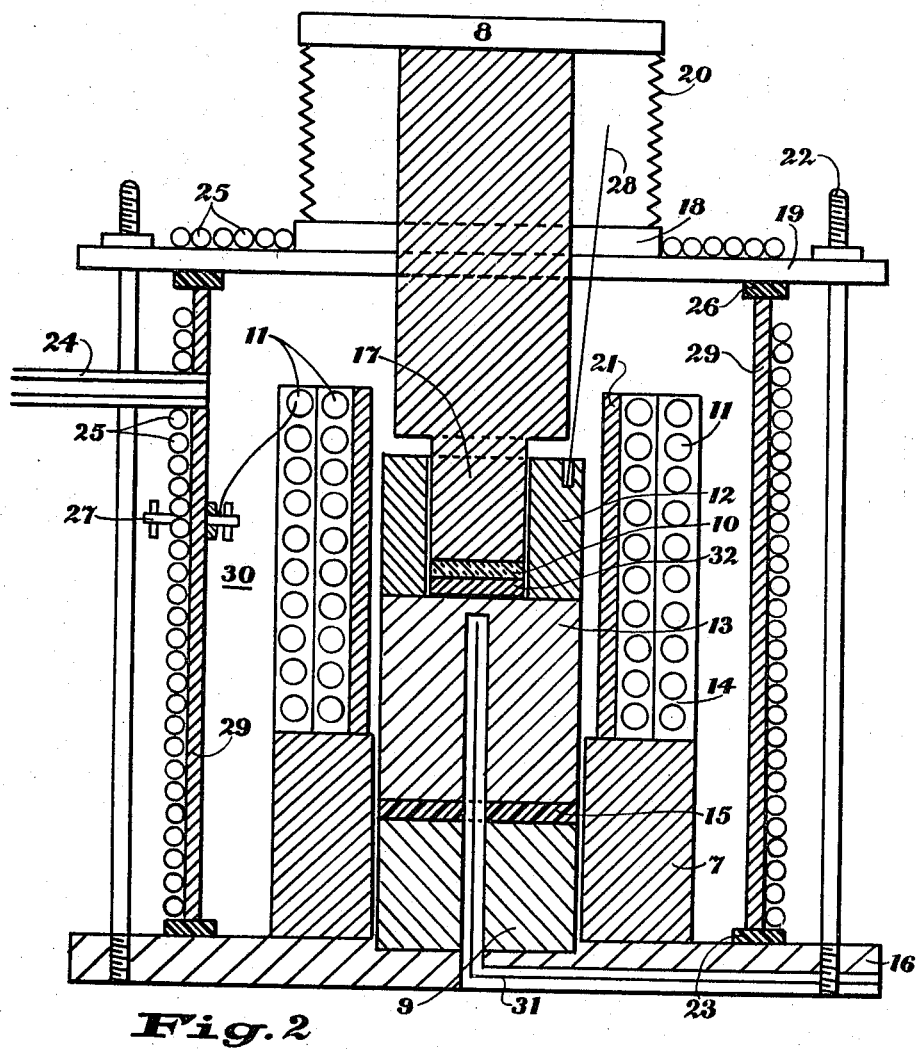
Edward Carnall, Jr.
INVENTOR

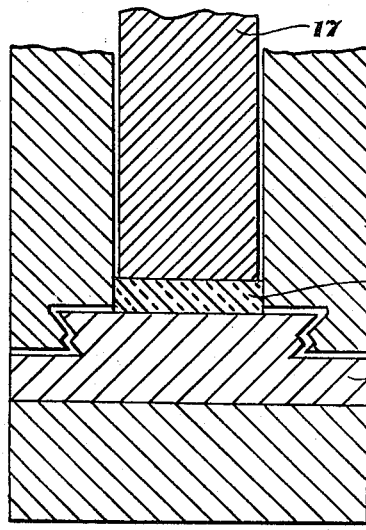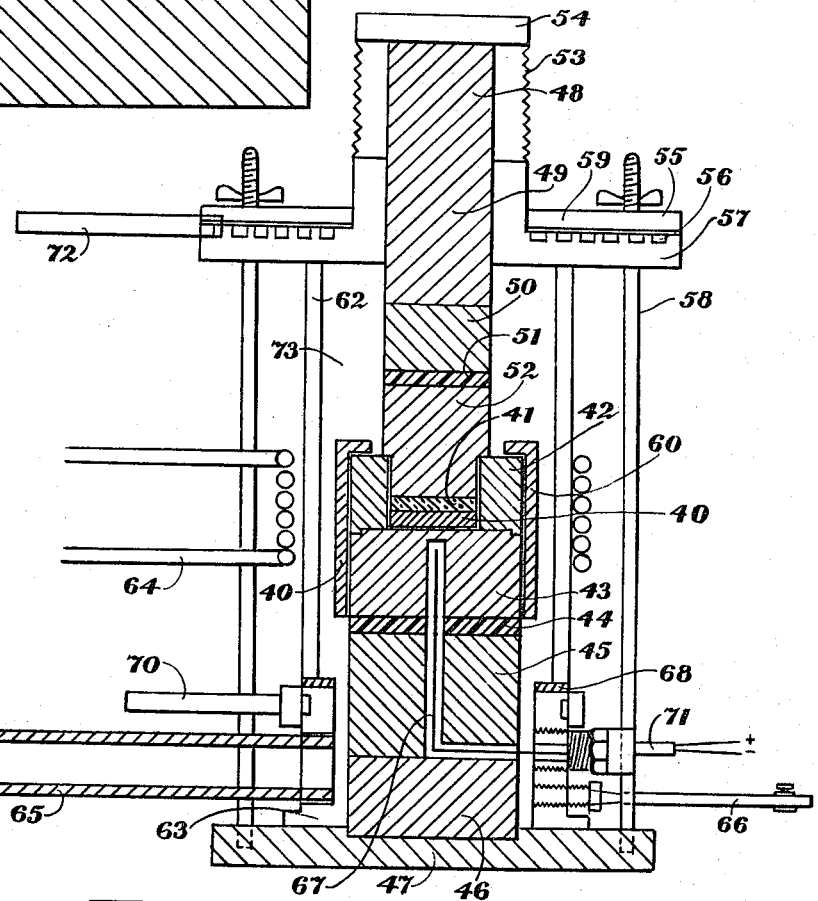

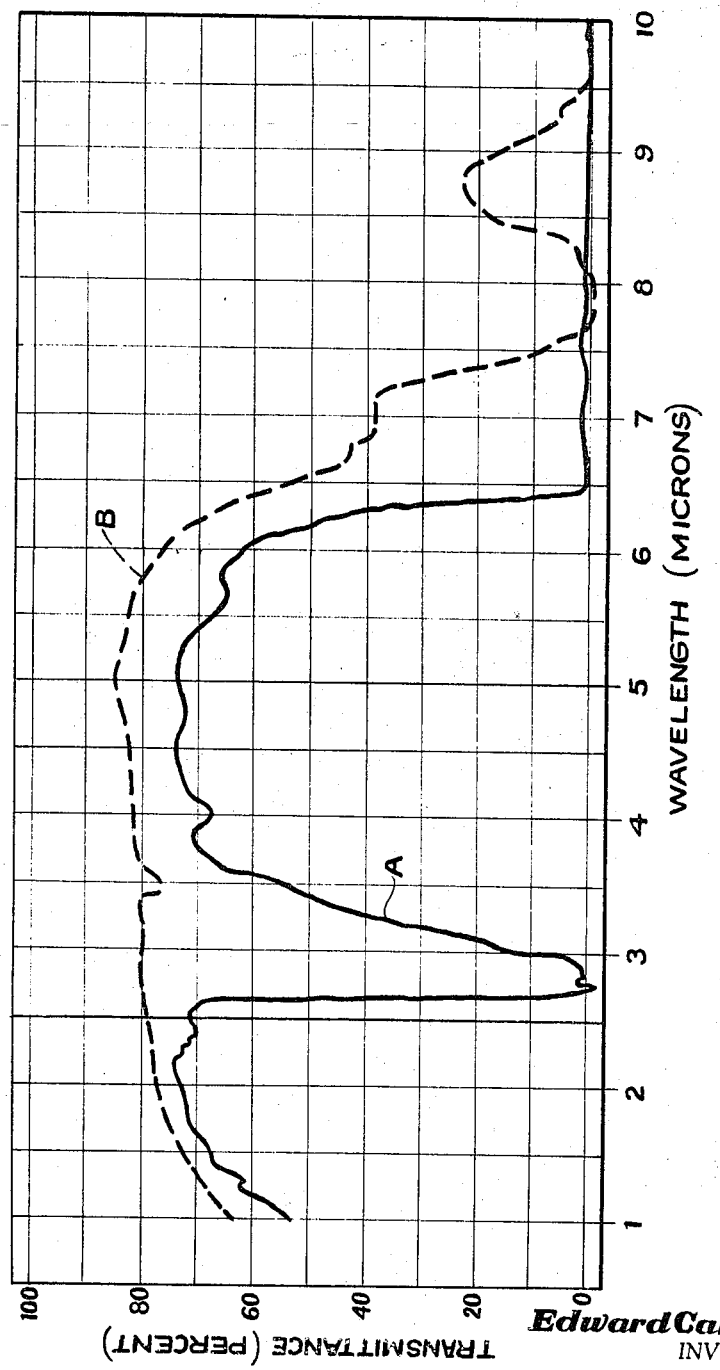

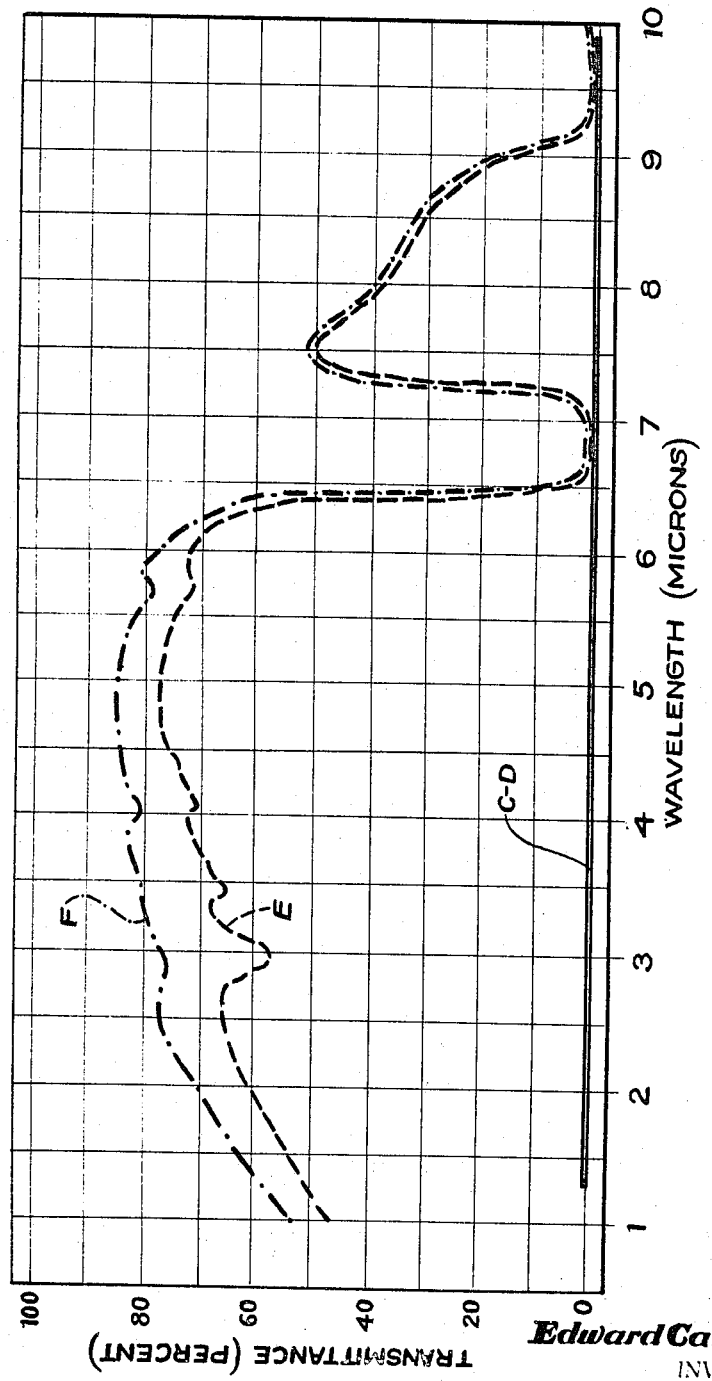

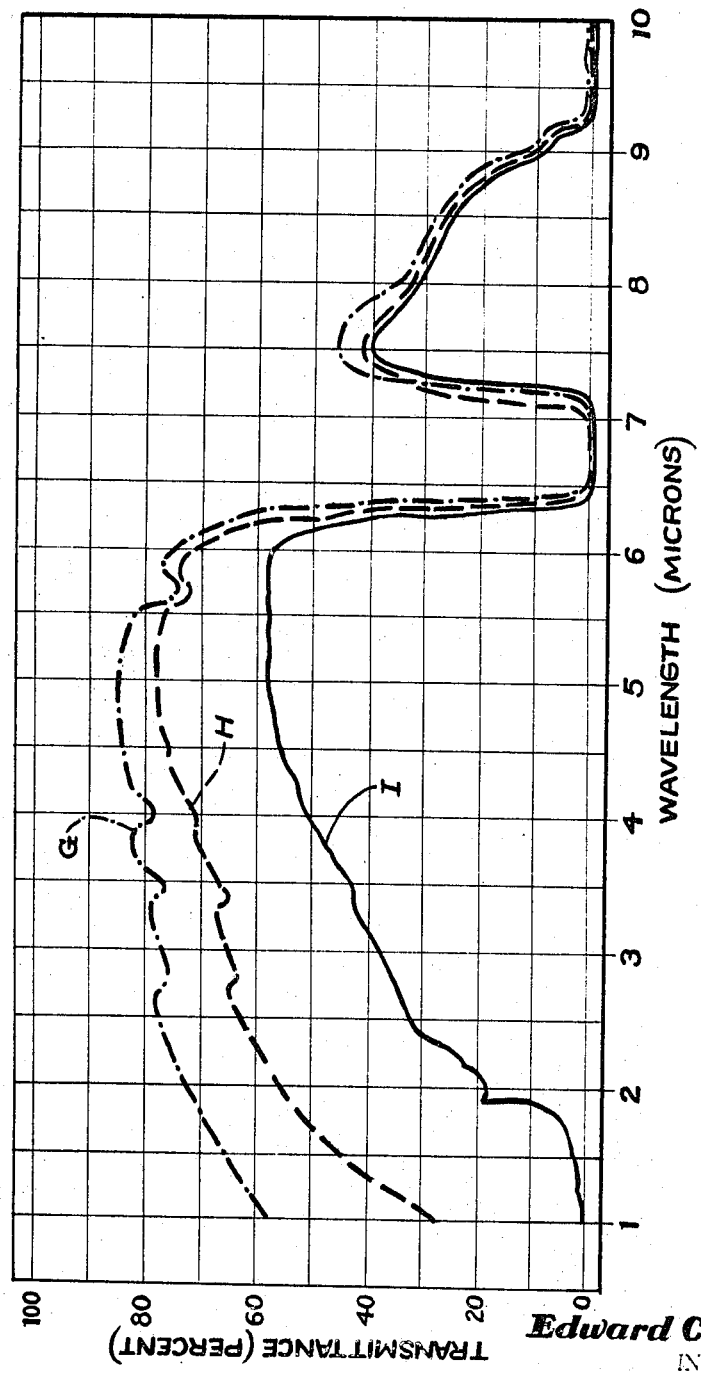

United States Patent Office 3,476,690
Patented Nov. 4, 1969

3,476,690
OPTICALLY USEFUL ELEMENTS OF HOT PRESSED LITHIUM FLUORIDE DOPED MAGNESIUM OXIDE AND METHOD OF FORMING SAME
Edward Carnall, Jr., Rochester, N.Y., assignor to Eastman Kodak Company, Rochester, N.Y., a corporation of New Jersey
Continuation-in-part of application Ser. No. 245,713, Dec. 19, 1962. This application Nov. 9, 1966, Ser. No. 617,727
Int. Cl. F21v 9/04; C04b 35/36
U.S. Cl. 252—300          7 Claims

ABSTRACT OF THE DISCLOSURE

In hot pressing magnesium oxide powder, a small amount of lithium fluoride is added to make possible successful pressing at pressures as low as 9500 p.s.i. and temperatures as low as 700° C. under inert conditions. Desirably the lithium fluoride is added in an amount between 0.5 and 10%. The resulting product contains only a trace of lithium fluoride, is transparent to both visible and infrared energy, and is characterized by good transmission of 2.8 micron wavelength energy, whereas previous hot pressed magnesium oxide articles absorbed energy of that wavelength.

---

This application is a continuation-in-part of U.S. patent application Ser. No. 245,713, filed Dec. 19, 1962, now abandoned.

This invention relates to optical elements and to methods for making optical elements. More particularly, this invention relates to dense optical elements of hot pressed magnesium oxide doped with lithium fluoride, and to methods of making such elements. These elements are characterized in that they have a basic polycrystalline structure wherein each individual constituent crystal is of microcrystalline size and substantially the same as other constituent crystals. The composite element is a homogeneous unitary article of at least 99% theoretical density useful as in infrared transmitting window suitable for the severe conditions encountered in missiles, projectiles, satellites and related devices.

An object, therefore, of the present invention is to pro- provide an article of manufacture consisting of lithium fluoride doped magnesium oxide.

Another object is to provide optically useful elements which can be hot pressed at a relatively low temperature.

Still another object is to provide optically useful elements which can be hot pressed at relatively low pressures.

Another object is to provide optically useful elements which have superior transmittance in the infrared and visible ranges of the electromagnetic spectrum.

Yet another object is to provide optically useful elements having the ability to withstand exposure to high temperatures.

Hot pressed magnesium oxide optical elements and a method for making them are described in Patent 3,236,-595, granted Feb. 22, 1966, in the names of Carnall and Hatch. Hot pressing of magnesium oxide without lithium fluoride requires pressures of at least 40,000 p.s.i. and temperatures between 800° C. and 860° C. The undoped magnesium oxide must be pressed at least 5 minutes under these conditions or else the window may not be pressed out of the apparatus It is known that extending heating and pressing times enables the pressing temperature to be reduced somewhat, but the differences are slight. Also, hot pressed optical elements consisting only of magnesium oxide have a severe absorption band at 2.8 microns wavelength.

According to the present invention, magnesium oxide doped with lithium fluoride, advantageously in an amount between .5% and 10% by weight, may be successfully hot pressed at pressures as low as 9,500 p.s.i. and at temperatures as low as 700° C. Proper doping with lithium fluoride improves the transmittance of the optical element, but, most significantly, it almost entirely eliminates the absorption band at 2.8 microns wavelength.

In accordance with the feature of this invention, lithium fluoride doped magnesium oxide powder is hot pressed in a compression mold under conditions of relatively high pressure, high temperature and under inert conditions provided by a high vacuum or an inert atmosphere, into a solid hot pressed unit of transparent polycrystalline lithium fluoride doped magnesium oxide. The mold may be of any suitable shape to form a window or lens of desired contour.

The invention will be further understood by reference to the following detailed description and drawing in which:

FIG. 1 is a view of transparent polycrystalline hot pressed lithium fluoride doped magnesium oxide solid molded from powder;

FIG. 2 is an elevated view, partially in section, of a compression molding device for hot pressing lithium fluoride doped magnesium oxide powder in accordance with this invention;

FIG. 3 is an elevation view, partially in section, of a modification of the apparatus shown in FIG. 2;

FIG. 4 is an elevation view, partially in section, of a compression molding device for molding lithium fluoride doped magnesium oxide powder into optical units which employs high frequency heating;

FIG. 5 is a graph showing the specular transmittance in the infrared region of transparent polycrystalline lithium fluoride doped magnesium oxide as compared with the transmittance of an element prepared solely from magnesium oxide;

FIG. 6 is a graph showing the specular transmittance in the infrared region of transparent polycrystalline elements prepared from the same lot of magnesium oxide and having added thereto differing amounts of lithium fluoride;

FIG. 7 is a graph similar to that of FIG. 6 and illustrating the transmittance of elements with still further differing amounts of lithium fluoride.

The molding apparatus shown in FIG. 2 comprises a base 16, silicone gasket 23, a block 9, a thermal insulator 15, a block 13, a molding cylinder 12 having a mold insert 32, a molding plunger 17 having a head 8 which is adapted to be attached to a prime mover, not shown, such as the piston of a hydraulic press to move the plunger 17 vertically into and out of molding cylinder 12 and thereby press the lithium fluoride doped magnesium oxide powder into the solid unit shown at 10.

The head 8 is attached to a lining ring 18 by metal bellows 20 thereby assuring a vacuum seal around the upper portion of plunger 17.

A cylinder 21 encloses the molding block 12 and the lower portion of plunger 17, and is supported on block 7. The heating unit 14 comprising a refractory casing is positioned around cylinder 21 and is also supported on block 7 and contains electric heating coils 11, the terminals for which are shown at 27.

The cylinder 29 is positioned concentrically in respect to cylinder 21 and forms a vacuum chamber 30, the ends of which are closed by gasket 23–26 and plate 16 and 19. Cooling coils 25 are positioned in contact with the outer surface of cylinder 29. A conduit 24 connects the vacuum chamber 30 to a suitable vacuum system not shown. The assembly is further secured by coaction of top plate 19 and multiple threaded rods 22 and base 16.

Temperature is measured by either one or by both thermal couples 28 and 31 which are suitably located in channels respectively positioned adjacent the molding position. The block 13 and cylinder 12 with its mold insert 32 may be made of molybdenum, molybdenum alloy or super alloys. Block 9 may be made of nichrome or stainless steel.

A satisfactory hot pressed, transparent polycrystalline lithium fluoride doped magnesium oxide window may be made employing the apparatus shown in FIG. 2 as follows:

A small amount of lithium fluoride powder is added to the magnesium oxide powder and the two are blended together for about 1 hour at room temperature. The resulting lithium fluoride doped magnesium oxide powder is then introduced into the cavity of cylinder 12 beneath plunger 17. Chamber 30 is evacuated through pipe 24, next cooling water is circulated through the cooling coils 25 and also through the platens, not shown, of the hydraulic press, and then electric current is applied to the heater coil 11 through terminals 27. The temperature of the mold is monitored by means of platinum-rhodium thermal couples 28 and 31. When the hot pressing mold has been heated to at least 700° C., as indicated by thermal couple 31, force is applied to the head 8 of plunger 17 by the hydraulic press, not shown, and the pressure is raised on the lithium fluoride doped magnesium oxide powder to approximately 9,500 p.s.i. This pressure is maintained on the lithium fluoride doped magnesium oxide for about 2 minutes while the temperature is held between 700° C. and 850° C. At the end of the pressing period, the power is shut off and the pressure released slowly. The vacuum pump is shut off and argon or other inert gas, is bled into chamber 30. The assembly is allowed to cool to about room temperature as reported by the thermal couple. Due to the nature of the thermal couple technique, the indicated temperature for optimum results may vary from apparatus to apparatus by as much as approximately plus or minus 10%.

The plunger 17 is withdrawn from cylinder 12 and the piece of polycrystalline transparent lithium fluoride doped magnesium oxide powder 10 is permitted to cool and is removed from the apparatus and employed as desired.

Referring to FIG. 3, there is shown a modified cylinder 120 which replaces cylinder 12 of the apparatus of FIG. 2 and a threaded plug 130 which replaces the mold insert 32 of the apparatus of FIG. 2. When the modified cylinder 120 with its threaded plug 130 is used, the window is molded directly on the threaded plug which serves as a base, whereas with the mold insert as shown in FIG. 2, since the sample is positioned within the cylinder a distance equal to the thickness of the mold insert, there is a greater possibility of difficulty in removing the sample from the cylinder. Also, the amount of wedging in the sample is minimized when the mold as shown in FIG. 3 is used, since the threaded plug is seated firmly against the bottom edge of the mold cylinder whereas in FIG. 2 the mold insert can tilt slightly in the cylinder. This modified apparatus, however, can be operated to produce a lithium fluoride doped magnesium oxide transparent polycrystalline article as described in connection with the operation of the apparatus of FIG. 2.

Referring to FIG. 4, an elevation view, partly in section, another modification of the molding apparatus is shown. This modification employs high frequency heating. In general, however, the parts of the apparatus are similar in kind and operation to that shown in FIG. 2.

The pressed lithium fluoride doped magnesium oxide powder is shown at 41. The apparatus comprises molding cylinder 42, with its mold insert 40, molding blocks 43, insulator 44 and support blocks 45 and 46. Block 46 rests on base 47. A graphite sleeve 60 is positioned between induction heating coil 64 and members 42 and 43. Also positioned on base 47 is a cylinder chamber 63 through which vacuum conduit 65, a vacuum release conduit 66 and a thermal couple conduit 71 extend. A water pipe 70 connects the chamber 63 to a water supply, not shown. The thermal couple is shown at 67. A quartz cylinder 62 is positioned on member 63 and separated therefrom by a gasket 68. Cylinders 62 and 63 thus form a vacuum chamber 73, the upper portion of which is closed by plate 57 having water cooling channels 56 therein. Cooling water is supplied through conduit 72 to channels 56. The gasket 55 forms the upper surface of the channel 56 and is held in position by clamping plate 59. The assembly is clamped by a plurality of clamping rods 58 and co-operating wing nuts. The mold plunger 48 extends through an aligning aperture in plate 57. Freedom of motion of the plunger and a vacuum seal are achieved by means of metal bellows 53, the ends of which are sealed respectively to the head 54 of plate 48 and plate 57.

The molding plunger 48 comprises three sections; section 49 is preferably made of stainless steel, section 50 of nichrome and section 52 of molybdenum. An insulator 51 is positioned between sections 50 and 52.

The insulators 51 and 54 are of Transite or of materials of similar or superior thermal insulating properties which will withstand the high temperatures and pressures involved. In the apparatus of FIG. 4, cylinder 42, block 43 and mold insert 40 are preferably of molybdenum or molybdenum alloy. Block 45 is of nichrome and block 46 is of nichrome or stainless steel. The top plates 57 and 59, the base plate 47 and the cylindrical chamber 63 may be of aluminum.

Since molybdenum does not couple efficiently with the high frequency field, a graphite sleeve 60, which fits snugly over the molding cylinder is employed. The high frequency field heats the graphite which in turn heats the mold parts by thermal conduction. If a situation arises in which it is desirable to eliminate the graphite susceptor 60, it is preferable to make the plunger section 52, cylinder 42 and block 43 of a material which couples efficiently with the high frequency field. Metals such as the high temperature nickel base alloys may be used.

The apparatus of FIG. 4 is operated at substantially the same schedule of temperature, pressure and vacuum as described above, but due to the high frequency heating, the heating cycle can be reduced.

FIG. 5 shows as curve A the infrared transmittance of magnesium oxide pressed according to the previously mentioned Carnall et al. Patent 3,236,595. Curve B shows the effect of the addition of 1% by weight of lithium fluoride. It will be noted that the over-all level of transmittance is increased and that the undesirable absorption band at 2.8 microns wavelength is removed as is the absorption band at 6.57 to 7.6 microns wavelength. The sample for Curve A was pressed at 850° C. and 57,000 p.s.i., and the sample for Curve B was pressed at 850° C. and 9,500 p.s.i.

FIG. 6 illustrates the effect of the addition of lithium fluoride to a batch of magnesium oxide under constant conditions of temperature and pressure during hot pressing. FIG. 7 is similar to FIG. 6 except for further variations in the amount of lithium fluoride added.

It is to be understood that production batches of magnesium oxide necessarily contain small amounts of contaminants which affect transmittance. Though it is desirable to keep the amount of contaminants to a minimum, reference to magnesium oxide powder in this description and in the claims necessarily includes powder having small amounts of contaminants since it is impractical to produce pure magnesium oxide powder, or to expect completely reproducible results from one batch to the next. However, the variation due to the batch is within tolerances and, in any event, the addition of a small amount of lithium fluoride as taught by the present invention improves the characteristics of the elements regardless of the original properties of the batch. This is illustrated in FIGS. 6 and 7 wherein the amounts of lithium fluoride are varied while the other conditions are kept constant. The conditions for the curves in FIGS. 5–7 are shown in Table I below.

TABLE I

| | Percent LiF | Pressing Temp., °C. | Pressing Pressure p.s.i. | Corrected Element, mm. Thickness |
|---|---|---|---|---|
| Curve: | | | | |
| A | 0 | 850 | 57,000 | 1.85 |
| B | 1.0 | 850 | 9,500 | 1.85 |
| C | 0 | 850 | 9,500 | 1.85 |
| D | 0.2 | 850 | 9,500 | 1.85 |
| E | 0.5 | 850 | 9,500 | 1.85 |
| F | 1.0 | 850 | 9,500 | 1.85 |
| G | 2.0 | 850 | 9,500 | 1.85 |
| H | 5.0 | 850 | 9,500 | 1.85 |
| I | 10.0 | 850 | 9,500 | 1.85 |

A 1 to 2% by weight addition of lithium fluoride to magnesium oxide appears to be the most suitable concentration for obtaining maximum transmittance. As can be seen in FIG. 7, increased concentrations result in a decrease in short wavelength transmittance probably due to the second phase scattering. Less than 0.5% lithium fluoride addition also results in decreased transmittance, probably due to porosity under the pressure and temperature conditions used.

At 850° C. with 1% lithium fluoride present, maximum transmittance can be obtained by pressing at 9,500 p.s.i. Higher pressures up to 57,000 p.s.i. cause no further improvement in transmittance. At 4,700 p.s.i. the powder is not uniformly pressed although transparent areas are present. No information is available as to just where suitable pressing becomes feasible, but indications are that it is somewhat below 9,500 p.s.i.

When .5% lithium fluoride is used, the pressure required to obtain a transparent window when heated at 850° C. is 28,500 p.s.i. With 2% lithium fluoride added, the temperature can be reduced to 700° C. if 48,000 p.s.i. is used. Thus the pressure and temperature can be varied and equal results obtained depending upon the amount of lithium fluoride added to the magnesium oxide powder.

Most of the lithium fluoride is burned out of the powder during the hot pressing operation, only a trace remaining. For example, I have found that when the magnesium oxide contained 1% of lithium fluoride initially, the product after hot pressing contained only about 0.02%; and 3% initially was reduced to only about 0.03%.

The effect of lithium fluoride appears to be quite specific. Lithium chloride, lithium carbonate, sodium fluoride, rubidium fluoride, magnesium fluoride, manganese fluoride, ferric fluoride, lead fluoride and beryllium fluoride have all been added to magnesium oxide in 1% weight concentrations. In all cases, the pressed elements proved unsuitable because they were opaque. The elements including these various salts were made at 850° C. with 57,000 p.s.i. pressure applied.

The advantageous results gained by adding small concentrations of lithium fluoride to magnesium oxide before hot pressing probably can be attributed to several factors. The following explanation is conjectural and not intended to limit the scope of the invention.

At the time my parent application was filed, the following theory was advanced to explain the improvement secured with lithium fluoride. The hot pressing is carried out very close to the melting point of lithium fluoride. It is known that magnesium oxide powder usually contains water which is present as a layer on the surface of the crystals. This is readily seen in Curve A of FIG. 5. The addition of lithium fluoride to the magnesium oxide powder upon heating to 700–850° C. causes water to be removed as evidenced by Curve B of FIG. 5 in which the broad absorption band at 2.8 microns wavelength disappears. Apparently the lithium fluoride is capable of behaving as a flux to remove the water layer from the crystals such as to allow the lithium fluoride to react with the magnesium oxide.

Since lithium fluoride and magnesium oxide react, the products of the reaction will remain at the surface of the individual crystals. It is not expected that extensive volume diffusion would occur because of the low temperature and short time involved. It would therefore seem desirable to consider the reaction $$2LiF + MgO \rightarrow MgF_2 + Li_2O$$

as removing gross surface defects from the magnesium oxide crystals and resulting in an active magnesium oxide surface, which is coated with magnesium fluoride and lithium oxide. It is suggested that the ability of the magnesium oxide particles to undergo plastic deformation under lower temperatures and pressures when lithium fluoride is present is due to the weaker bonding of the magnesium fluoride and lithium oxide on the surface of the crystals and the ease with which these can be dislocated relative to the stronger bonding which must be overcome before magnesium oxide will dislocate.

Further study since the parent application was filed has led to modifications of the theory, and it is now thought that the following explanation is more apt to be scientifically correct.

The initial MgO powder is known to contain a surface layer made up of OH⁻ and $CO_3^=$ which is not fully removed in conventional hot pressing or by firing. As noted above, the LiF largely removes these impurities. When the soak and pressing temperature is above the melting point of LiF (842° C.), the LiF is present as a liquid phase. During the soak periods, significant densification occurs by three processes, first, a particle rearrangement caused by particles moving about under the influence of surface tension to achieve the most efficient packing, second, a solution-reprecipitation process occurs whereby MgO particles dissolve in the LiF and reprecipitate on larger MgO crystals. During this process, the impurities on the MgO surfaces are apparently removed by the LiF. Both the impurities and the excess LiF are removed as compaction proceeds. The third process results in the formation of a solid skeleton, and the densification process continues at a slower rate until pressure is applied.

Densification has also been found to occur at temperatures between 700–750° C. up to the melting point of the LiF. Here, it is believed that evaporation of the microcrystals of LiF, which have a very large surface area, occurs at a sufficiently fast rate that the MgO crystals are coated in short times and densification appears to occur via the second and third processes described above. The details of how a solution-precipitation reaction may occur at these low temperatures is not clear. The kinetics, however, have been found to follow these processes.

When pressure is now applied to the LiF doped MgO compact, densification occurs very rapidly ("approximately" 1 minute) at pressures below the yield stress found for MgO single crystals. It is conjectured that the removal of impurities from the MgO surfaces by the action of the LiF removes a surface barrier which prevents the passage of dislocations thus enabling the MgO to plastically deform at the temperatures and pressures delineated.

The preferred exercise of the present invention is to blend together for 1 hour at room temperature 1% by weight of high purity lithium fluoride powder with magnesium oxide powder, both powders being of submicron size. The blended powder is then placed in cylinder 12 and cold pressed at 10,000 p.s.i. to compact the powder. The cylinder is then evacuated and the powder heated to 850° C. When the powder reaches 850° C., a pressure of 10,000 p.s.i. is applied. The pressure is maintained until the powder is fully compacted which takes about 2 minutes. The pressure is then released, the vacuum connection broken and the interior of the molding apparatus filled with argon while the pressed powder is allowed to cool. When near room temperature, the element is removed. After grinding and polishing the sample to remove any surface contamination, the element appears as a near water white, transparent material of substantially theoretical density.

The apparent removal of water from the compressed element enables the hot pressed pieces to withstand greater temperatures. That is, the elements doped with lithium fluoride are able to withstand higher temperatures than those consisting of magnesium oxide alone. This is because water present in the hot pressed elements will develop sufficient pressure at elevated temperatures to cause microcracks to form which scatter light and cause a loss in transmittance. The apparent decrease in water present in lithium fluoride doped elements curtails this effect.

Thus it is seen that the addition of a small concentration of lithium fluoride to magnesium oxide powder for hot pressing enables both an improved process to be practiced and improves the physical properties of the resulting element in several ways.

The invention has been described in detail with particular reference to preferred embodiments thereof, but it will be understood that variations and modifications can be effected within the spirit and scope of the invention as described hereinabove and as defined in the appended claims.

I claim:

1. An article of manufacture which transmits in the visible and infrared regions of the electromagnetic spectrum consisting of a homogeneous transparent solid of polycrystalline magnesium oxide hot pressed under a pressure of at least 9,500 p.s.i. at a temperature of at least 700° C. and under inert conditions, said solid containing lithium fluoride in an amount effective to substantially eliminate the severe absorption band at 2.8 microns wavelength which characterizes hot pressed transparent optical elements consisting only of magnesium oxide, said article being characterized by a density in the range of from 99% up to and including theoretical density.

2. An article of manufacture in accordance with claim 1 hot pressed from powder consisting essentially of magnesium oxide and .5% to 10% of lithium fluoride.

3. An article of manufacture in accordance with claim 2 hot pressed at a temperature in the range of 700° C. to 850° C.

4. The method of forming a homogeneous transparent polycrystalline microcrystalline solid comprising hot pressing a mixture of magnesium oxide powder and .5% to 10% lithium fluoride powder under a pressure of at least 9,500 p.s.i. at a temperature of at least 700° C. and under inert conditions.

5. A method as set forth in claim 4 wherein the process is carried out in an inert atmosphere.

6. A method as set forth in claim 4 wherein the process is carried out in a vacuum.

7. A method as set forth in claim 4 wherein said pressure is within the range from 9,500 to 57,000 pounds per square inch and said temperature is in the range of 700° C. to 850° C.

References Cited

UNITED STATES PATENTS 2,957,752  10/1960  Gloss _____ 106—58 X

RICHARD D. LOVERING, Primary Examiner

U.S. Cl. X.R.

106—58